Figure 1:
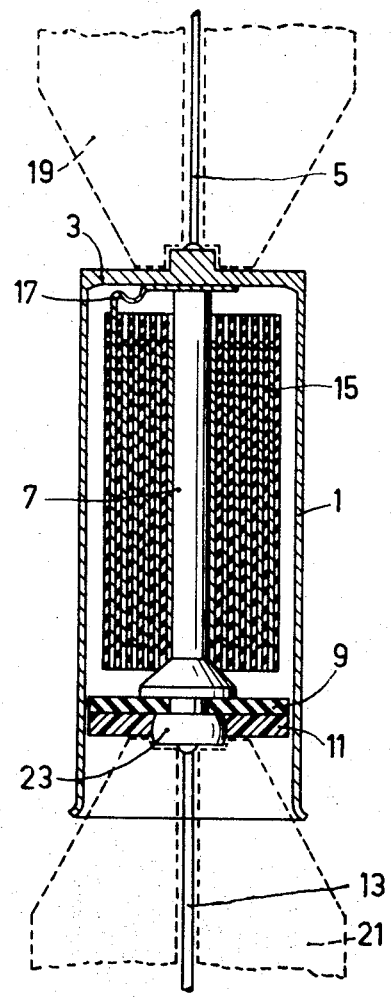

United States Patent [19]
Bugel

[11] 3,754,113
[45] Aug. 21, 1973

[54] METHOD OF ELECTRICALLY WELDING A CAPACITOR ELECTRODE TO THE CAPACITOR HOUSING

[75] Inventor: Roelof Dirk Bugel, Hattem, Netherlands

[73] Assignee: U.S. Philips Corporation, New York, N.Y.

[22] Filed: Apr. 25, 1972

[21] Appl. No.: 247,374

[30] Foreign Application Priority Data
May 8, 1971    Netherlands...................... 7106347

[52] U.S. Cl..................... 219/107, 29/570, 219/93, 317/230
[51] Int. Cl........................................... B23k 11/02
[58] Field of Search...................... 29/570; 219/107, 219/93; 317/230

[56] References Cited
UNITED STATES PATENTS
3,174,085  3/1965  Schroeder.............................. 29/570
3,555,370  1/1971  Bowling................................ 37/230

Primary Examiner—E. A. Goldberg
Attorney—Frank R. Trifari

[57] ABSTRACT

A method of electrically connecting an electrode of a capacitor roll which is supported by a metal pin to the bottom of a capacitor housing. To this end, a metal strip which is connected to the electrode is clamped between the metal pin and the bottom, after which an electric current is fed through the pin, the strip and the bottom.

4 Claims, 3 Drawing Figures

METHOD OF ELECTRICALLY WELDING A CAPACITOR ELECTRODE TO THE CAPACITOR HOUSING

The invention relates to a method of electrically connecting an electrode of a capacitor roll which is supported by a metal pin to the inner side of a metal bottom portion of a capacitor housing.

According to a known method of the kind set forth, before the capacitor roll supported by a metal pin is inserted into the empty housing, a long metal strip, connected to the roll situated outside the capacitor housing, is welded to the bottom portion by inserting a first welding electrode into the housing and by clamping the strip between the bottom portion and said welding electrode by means of a second welding electrode which is pressed against the bottom portion from the outside. Subsequently, a current of sufficient intensity is fed through the bottom portion and the strip. After withdrawal of the welding electrode from the capacitor housing, the capacitor roll, held outside the housing and supported by the metal pin, is slid into the housing where it is fixed in the usual manner.

One of the drawbacks of the described known method is that the already welded, long metal strip is folded when the roll is inserted into the housing, so that mechanical stresses are liable to arise at the weld area, which may cause deterioration or even facture of the weld. A further drawback is that the metal strip folded between the bottom of the housing and the roll may give rise to short-circuits by penetration of the end face of the roll. A further drawback yet is that the roll has to be held outside the housing by suitable means during welding.

The invention has for its object to obviate the said drawbacks.

To this end, the invention is characterized in that the capacitor roll supported by a metal pin is slid into the capacitor housing so far that a metal strip connected to the said electrode is clamped between the metal pin and the bottom portion, such a current being subsequently fed through the metal pin, the metal strip and the bottom portion that the metal strip is welded to the bottom portion, after which the metal pin with the capacitor roll is pulled away from the bottom portion and is fixed in the capacitor housing.

So as to reduce the risk that the metal pin is welded to the metal strip, or in other words so as to attain a comparatively high current density between the metal strip and the metal bottom portion and a comparatively low current density between the metal strip and the metal pin, in a special embodiment of the method according to the invention at least one of the sides of the metal strip and the metal bottom portion facing each other are profiled such that the contact area of the profile with the metal strip is substantially smaller than the contact area of the metal pin and the metal strip.

Figure 2:
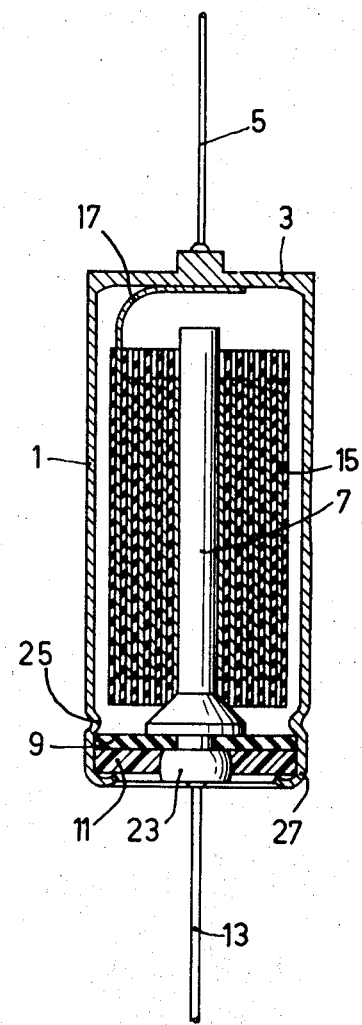
Figure 3:
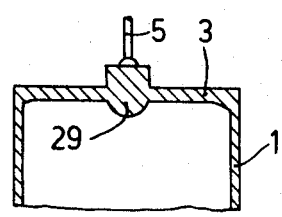

The invention will be described in detail with reference to the drawing, illustrating one embodiment of a method according to the invention. Therein:

FIG. 1 is a longitudinal sectional view through an electrolytic capacitor according to the invention during manufacture, FIG. 2 is a longitudinal sectional view of an electrolytic capacitor as shown in FIG. 1 in the assembled condition, whilst FIG. 3 is a sectional view through the capacitor housing bottom of a special embodiment of an electrolytic capacitor according to the invention.

The electrolytic capacitor shown in FIGS. 1 and 2 comprises an aluminum capacitor housing 1 which is open on one side and whose bottom 3 is provided with an electric roll connection strip 5. Arranged in the capacitor housing is an anode pin 7 made, for example, of aluminum, which is secured in a hard paper disc 9 and a rubber disc 11 and which is provided with an electric connection strip 13. Arranged about the anode pin 7 is a roll 15 comprising, successively from the inside to the outside, a formed aluminum anode foil, a paper foil which is impregnated with a commonly used electrolyte, an aluminum cathode foil, and a second impregnated paper foil. The anode pin 7 is at the same time used as the winding mandrel. So as to prevent short-circuits, the width of the paper foil is chosen to be larger than that of the aluminum foil. The portion 17 of the cathode foil extends outside the contour of the roll 15 and must be electrically connected to the bottom 3 of the capacitor housing 1.

The portion 17 of the cathode foil (outer electrode) is clamped according to the invention between the anode pin 7 which projects outside the contour of the roll 15 and the bottom 3 of the capacitor housing 1. A first electrode 19 is pressed from the outside against the bottom 3 and a second electrode 21 is pressed against a button-like end 23 of the anode pin 7. The electrode 19 is then slid over the connecting strip 5, whilst the electrode 21 is slid over the connecting strip 13. The electrodes 19 and 21 are subsequently connected to a current source which feeds a current through the bottom 3 of the capacitor housing, portion 17 of the cathode foil and the anode pin 7 of an intensity such that a reliable welded joint is obtained between portion 17 of the cathode foil and the bottom 3 of the capacitor housing 1. The electrodes 19 and 21 are withdrawn after the current has been switched off. The anode pin 7 with the roll 15 is then displaced with respect to the capacitor housing 1 such that approximately the position shown in FIG. 2 is reached. Next, a circumferential rill 25 is pressed into the capacitor housing 1 just below the hard paper disc 9, after which the edge at the end of the housing 1 is spun over as is shown at 27 in FIG. 2. The final location of the discs 9 and 11 with respect to the capacitor housing, and hence the location of anode pin 7 and roll 15, is thus laid down.

In a special embodiment of the method according to the invention, the bottom 3 is provided with a spherical raised portion 29 from the inside of the capacitor housing. In this way a high current density and a large welding pressure are obtained. It was found in practice that a sphere diameter of 1 mm offers a very favorable result for a thickness of the metal strip of 0.2 mm. Due to the high welding pressure, any electrolyte residue present on the raised portion 29 will be pressed away so that no gas can be trapped in the welded joint. The high current density ensures that a very reliable welded joint is obtained between the raised portion 29 and the strip. Instead of being provided with a spherical raised portion 29, the bottom 3 may also be provided with other suitable profiles such as, for example, rills. It is alternatively possible to provide the side of the strip facing the bottom 3 with a suitable profile such as, for example, small identations.

So as to reduce the contact resistance between the anode pin 7 and the strip 17, the end face of the anode pin 7 facing the strip 17 can be roughened, for example, by grinding. Any aluminum oxide film present will thus be broken up so that an intimate metallic contact is obtained between the anode pin 7 and the strip 17.

The portion 17 which is welded to the bottom 3 of the capacitor housing need not necessarily be a continuation of the cathode foil, but may also be formed by a separate metal strip which is welded to the cathode foil. The separate connection between electrode and metal strip is thus avoided.

The method according to the invention can be successively applied for electrolytic capacitors containing a liquid electrolyte as well as for electrolytic capacitors having a semi-solid or solid electrolyte, and also for non-electrolytic roll capacitors.

A method according to the invention is particularly suitable for bulk manufacture because the multiple function of the anode pin, i.e., winding mandrel, welding electrode and current conductor, constitutes a reduction of the number of operations with respect to the known methods.

What is claimed is:

1. The method of structurally connecting an electrode of a capacitor roll to an inner side of a bottom portion of a capacitor housing, said capacitor roll being supported by a pin and said electrode connected to a strip member, said method comprising the steps of:
   A. inserting the capacitor roll and pin into the capacitor housing sufficiently far enough to clamp said strip member between the pin and the bottom portion of said capacitor housing;
   B. feeding current through the pin so as to weld the strip member to said bottom portion;
   C. detaching the pin from said strip member; and
   D. fixing the pin within the housing in the detached position.

2. The method of claim 1, wherein a high current density is achieved at the weld between said strip member and said bottom portion by providing said bottom portion and strip member with a contact area that is considerably smaller than that common to the pin and strip member.

3. The method of claim 2, wherein said smaller contact area is provided by forming a raised portion in the housing bottom portion adjacent said strip member.

4. The method of claim 1, wherein said capacitor roll is provided for insertion into said housing by first forming said roll about said pin from successive layers of aluminum anode foil, a first paper foil impregnated with an electrolyte, an aluminum cathode foil, and a second impregnated paper foil, said anode foil contacting said pin and a portion of the cathode foil serving as said strip member for attachment to said housing.

* * * * *